(12) United States Patent
McCune et al.

(10) Patent No.: US 10,719,587 B2
(45) Date of Patent: Jul. 21, 2020

(54) MANAGING ENTITLEMENTS IN A NETWORKED ENVIRONMENT

(75) Inventors: Michael B. McCune, Beaverton, OR (US); Peter A. Vetere, Raleigh, NC (US); Robin L. Norwood, Garner, NC (US); Maureen E. Duffy, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1801 days.

(21) Appl. No.: 12/215,220

(22) Filed: Jun. 25, 2008

(65) Prior Publication Data

US 2009/0328056 A1 Dec. 31, 2009

(51) Int. Cl.
  *G06F 21/10* (2013.01)
  *G06F 8/61* (2018.01)

(52) U.S. Cl.
  CPC ............. *G06F 21/105* (2013.01); *G06F 8/61* (2013.01)

(58) Field of Classification Search
  CPC ........................... G06F 21/105; G06F 9/45537
  USPC ........................................................ 718/100
  See application file for complete search history.

(56) References Cited

U.S. PATENT DOCUMENTS

| | | | |
|---|---|---|---|
| 6,854,009 B1* | 2/2005 | Hughes | 709/220 |
| 6,959,291 B1* | 10/2005 | Armstrong et al. | 705/59 |
| 7,383,327 B1 | 6/2008 | Tormasov et al. | |
| 7,461,249 B1* | 12/2008 | Pearson | G06F 21/10 705/59 |
| 7,533,133 B1* | 5/2009 | Lanzatella | G06F 21/6218 |
| 7,865,765 B2* | 1/2011 | Trevathan et al. | |
| 8,239,557 B2 | 8/2012 | McCune et al. | |
| 2002/0165961 A1* | 11/2002 | Everdell | H04L 41/22 709/225 |
| 2003/0069974 A1 | 4/2003 | Lu et al. | |
| 2004/0044895 A1* | 3/2004 | Reasons | G06F 21/10 713/182 |
| 2005/0021995 A1* | 1/2005 | Lal et al. | 713/200 |
| 2005/0073443 A1* | 4/2005 | Sheha | G01C 21/36 340/995.1 |
| 2006/0004667 A1* | 1/2006 | Neil | 705/59 |
| 2006/0020790 A1* | 1/2006 | Sprunk | H04N 7/163 713/167 |
| 2006/0277307 A1 | 12/2006 | Bernardin et al. | |
| 2007/0043860 A1 | 2/2007 | Pabari | |

(Continued)

OTHER PUBLICATIONS

Wikipedia, "Windows Update" article. 4 pages, Apr. 20, 2008.*

(Continued)

*Primary Examiner* — George Giroux
(74) *Attorney, Agent, or Firm* — Lowenstein Sandler LLP

(57) ABSTRACT

Some embodiments of an entitlement model have been presented. In one embodiment, a centralized server distributes copies of an operating system from a software vendor to a set of virtual guests of a virtual host running on a physical computing machine. The centralized server and the physical computing machine are coupled to each other within an internal network of a customer of the software vendor, whereas the centralized server has access to the software vendor external to the internal network of the customer. The centralized server may interact with a hypervisor of the physical computing machine to determine what type of license of the operating system the virtual host has and a number of copies of the operating system requested by the virtual guests.

23 Claims, 13 Drawing Sheets

(56) References Cited

U.S. PATENT DOCUMENTS

| | | | | |
|---|---|---|---|---|
| 2008/0082811 A1* | 4/2008 | Davis | .................... | G06F 9/4401 |
| | | | | 713/2 |
| 2009/0089780 A1* | 4/2009 | Johnson | .................. | G06F 9/455 |
| | | | | 718/1 |

OTHER PUBLICATIONS

"Red Hat Network Satellite: Release Notes 5.0.0", accessed at: http://www.redhat.com/docs/manuals/satellite/Red_Hat_Network_Satellite-5.0.0/html/Release_Notes/Release_Notes.html on Jul. 15, 2010, 3 pages.

"Red Hat Enterprise Linux 5: Virtualization", accessed at: http://www.redhat.com/rhel/virtualization/ on Jun. 20, 2008, 4 pages.

"About Cobbler", accessed at: http://cobbler.et.redhat.com/ on Jun. 20, 2008, 1 page.

"Welcome to VirtualBox.org", accessed at: http://www.virtualbox.org/ on Jun. 20, 2008, 1 page.

"VMware Products", accessed at: http://www.vmware.com/products/ on Jun. 20, 2008, 1 page.

Duffy, M., "Red Hat Network Satellite 5.0.0: Virtualization Step-by-Step", Jun. 2007, 22 pages.

"Systems Management", accessed at: http://www.redhat.com/systems_management/management/ on Jun. 20, 2008, 3 pages.

"Red Hat Network Overview", accessed at: http://www.redhat.com/rhn/ on Jun. 11, 2008, 3 pages.

"Red Hat Network Tour", accessed at: http://www.redhat.com/rhn/rhntour/index.html on Jun. 11, 2008, 6 pages.

"Red Hat News: Looking for Huge Performance Gains? Virtualize With Red Hat Enterprise Linux 5", accessed at: http://www.press.redhat.com/2007/09/21/looking-for-huge-performance-gains-virtualize-with-red-hat-enterprise-linux-5/ on Jun. 18, 2008, 4 pages.

"Virtual Machine", accessed at: http://en.wikipedia.org/wiki/Virtual_machine on Jun. 18, 2008, last updated Jun. 11, 2008, 6 pages.

"Build the Foundation of a Responsive Data Center", accessed at: http://www.vmware.com/products/vi/esx/esx_overview.html on Jun. 18, 2008, 2 pages.

"Virtualization Basics", accessed at: http://www.vmware.com/technology/virtual-machine.html on Jun. 18, 2008, 2 pages.

"VWare ESX 3.5: Virtualize Your Servers, Storage and Networking Resources", Product Datasheet, 2008, 4 pages.

"Virtualization Basics", accessed at: http://www.vmware.com/overview/history.html on Jun. 18, 2008, 2 pages.

"Virtualization Basics", accessed at: http://www.vmware.com/technology/virtual-infrastructure.html on Jun. 18, 2008, 2 pages.

"Hypervisor", accessed at: http://en.wikipedia.org/wiki/Hypervisor on Jun. 23, 2008, last updated Jun. 20, 2008, 4 pages.

"About RHN", accessed at: http://rhn.redhat.com/help/about.pxt on Jun. 23, 2008, 2 pages.

Office Action dated May 14, 2010 for U.S. Appl. No. 12/215,333, filed Jun. 25, 2008, 10 pages.

Final Office Action for U.S. Appl. No. 12/215,333 dated Oct. 6, 2010.

Advisory Action for U.S. Appl. No. 12/215,333 dated Dec. 8, 2010.

Notice of Allowance for U.S. Appl. No. 12/215,333 dated Apr. 9, 2012.

* cited by examiner

Virtual Systems

Sidebar:
- Overview
- Systems
  - All
  - Virtual Systems
  - Out of Date
  - Unentitled
  - Ungrouped
  - Inactive
  - Recently Registered
  - Proxy
  - System Groups
  - System Set Manager
  - Advanced Search
  - Activation Keys
  - Stored Profiles
  - Custom System Info
  - Kickstart Filter by System: [ ] [Go]

A B C D E F G H I J K L M N O P Q R S T U V W X Y Z 0 1 2 3 4 5 6 7 8 9

1 - 20 of 33 (1 selected)  |< < > >|

| | System | Updates | Status | Base Software Channel |
|---|---|---|---|---|
| ■ | Host: test02-vmx.rhndev.redhat.com 3 Active Virtual Systems, 16 Total. (View All) | | | |
| ☐ | ↳ dhcp77-206.rhndev.redhat.com | Unknown | Stopped | Red Hat Enterprise Linux (v. 5 for 32-bit x86) |
| ☐ | ↳ mmccune-f8-3 | | Running | (none) |
| ☐ | ↳ mmccune-f8-2 | | Stopped | (none) |
| ☐ | ↳ partha-f9 | | Stopped | (none) |
| ☐ | ↳ sat422guest2 | | Stopped | (none) |
| ☐ | ↳ jesusr-f9 | | Stopped | (none) |
| ☐ | ↳ Zombie-partha2-f9 | | Stopped | (none) |
| ☐ | ↳ dhcp77-230.rhndev.redhat.com | Unknown | Running | Red Hat Enterprise Linux (v. 5 for 32-bit x86) |
| ☐ | ↳ dgoodwin-f9-2 | | Stopped | (none) |
| ☐ | ↳ mmccune-centos-51 | | Stopped | (none) |
| ☐ | ↳ dgoodwin-f9-1 | | Stopped | (none) |
| ☐ | ↳ mmccune-rhel4 | | Stopped | (none) |
| ☐ | ↳ sat500guest | | Stopped | (none) |
| ☐ | ↳ dhcp77-238.rhndev.redhat.com | Unknown | Stopped | Red Hat Enterprise Linux (v. 5 for 32-bit x86) |
| ☐ | ↳ dhcp77-239.rhndev.redhat.com | Unknown | Running | Red Hat Enterprise Linux (v. 5 for 32-bit x86) |
| ☐ | ↳ mmccune-centos-51-2 | | Stopped | (none) |
| ■ | Host: test01-vmx.rhndev.redhat.com 3 Active Virtual Systems, 6 Total. (View All) | | | |
| ☐ | ↳ summit | | Stopped | (none) |
| ☐ | ↳ dhcp77-222.rhndev.redhat.com | Unknown | Stopped | Red Hat Enterprise Linux (v. 5 for 32-bit x86) |

[Update List] [Select All]

1 - 20 of 33 (1 selected)  |< < > >|

MANAGING ENTITLEMENTS IN A NETWORKED ENVIRONMENT

COPYRIGHT NOTICE

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright© 2008 Red Hat, Inc.

TECHNICAL FIELD

Embodiments of the present invention relate to an entitlement model, and more specifically to managing entitlements in a networked environment.

BACKGROUND

Today, virtualization of computing resources has been gaining popularity because of increased operational flexibility. Broadly speaking, virtualization is emulation of physical hardware. A virtual machine, thus, refers to generally a software implementation of a machine that executes programming instructions to perform operations and tasks as if executed by a physical machine, such as a personal computer. A virtual machine may be a virtual host or a virtual guest. In some conventional systems, the virtual host and the virtual guests are all virtual machines running under the hypervisor, which is a virtualization controller running on the physical machine. In some conventional systems, an operating system running on the physical machine acts as a host to one or more virtual guests.

Currently, users have to use various tools or procedures outside of a centralized server to install an operating system onto a physical machine, and then to install a virtualization controller, which is typically referred to as a hypervisor of the physical machine. Then the users may use the hypervisor to provision virtual hosts and virtual guests on the physical machine. On each of the virtual hosts and virtual guests, the user has to manually install a copy of the operating system, such as Linux, Windows, etc. In general, the user needs to have a license for each copy of the operating system installed on the physical machine, the virtual hosts, or the virtual guests. Note that the operating system on the virtual hosts and virtual guests may or may not be the same. As the number of physical machines and the number of virtual machines grow in a networked system, management of licenses and the physical machines and the virtual machines becomes more complex and tedious.

BRIEF DESCRIPTION OF THE DRAWINGS

The present invention is illustrated by way of example, and not by way of limitation, in the figures of the accompanying drawings and in which:

FIGS. 4A-4F illustrate some embodiments of a graphical user interface.

DETAILED DESCRIPTION

Figure 1:
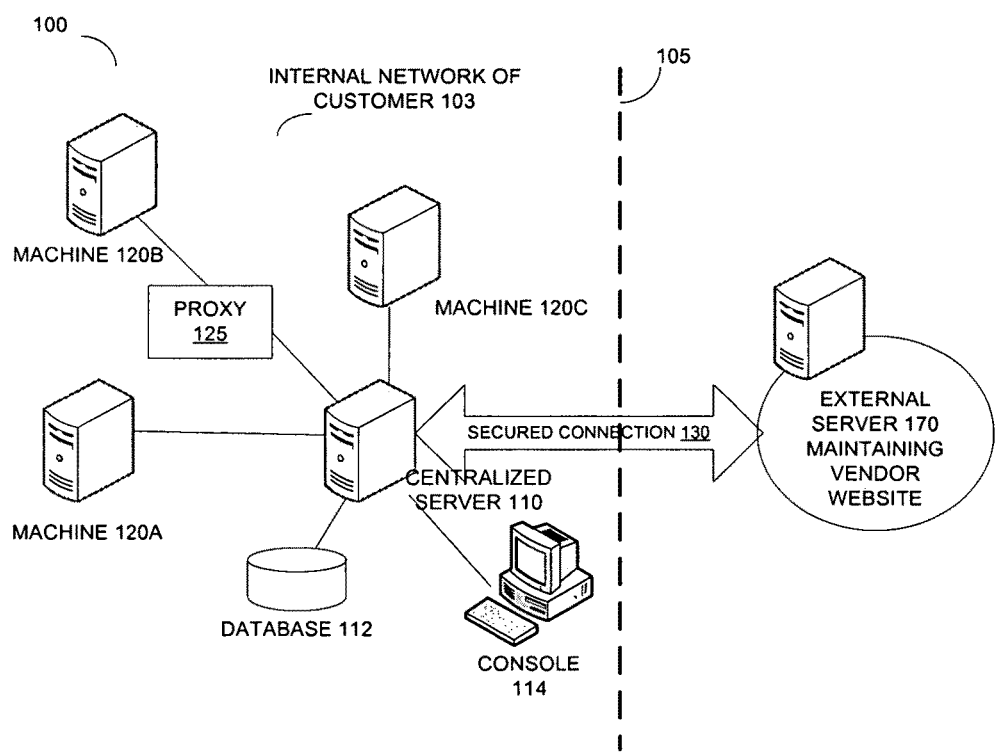
FIG. 1 illustrates one embodiment of a system in which embodiments of the present invention may be implemented.

Described herein are some embodiments of an entitlement model. As mentioned above, virtualization as used herein broadly refers to emulation of physical hardware, and a virtual machine broadly refers to a software implementation of a machine that executes programming instructions to perform operations and tasks as if executed by a physical machine. A virtual machine may be a virtual host or a virtual guest.

In some embodiments, a centralized server distributes copies of an operating system from a software vendor to a set of virtual guests of a virtual host running on a physical computing machine. The centralized server and the physical computing machine are coupled to each other within an internal network of a customer of the software vendor, whereas the centralized server has access to the software vendor external to the internal network of the customer. Copies of the operating system are distributed under a license from the software vendor. There are various types of licenses, such as an unlimited license or a limited license. Depending on the type of license, a virtual guest running a copy of the operating system may or may not consume an entitlement. An entitlement is the right to run a copy of the operating system on a single computing machine, which may be a real computing machine or a virtual computing machine. The centralized server may interact with a hypervisor of the physical computing machine to determine what type of license of the operating system the virtual host has and the number of entitlements currently consumed by the virtual guests. Based on the type of license held by the virtual host and the number of entitlements currently consumed by the virtual guests, the centralized server may grant or deny the request to install another copy of the operating system in a virtual guest. More details of the entitlement model are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. The system 100 includes a external server 170 maintained by a software vendor and an internal network 103 of a customer of the software vendor, coupled to each other via a secured connection 130, such as a virtual private network (VPN) over a public network (e.g., the Internet). The internal network 103 of the customer further includes components shown on the left side of the dotted line 105. As illustrated in FIG. 1, the internal network 103 of the customer includes a centralized server 110, a number of computing machines 120A-120C, a database 112, and a console 114. The computing machines 120A-120C are physical hardware, such as servers, workstations, desktop personal computers (PCs), laptops, etc. The computing machines 120A-120C, the console 114, and the database 112 are coupled to the centralized server 110 within the internal network 103. In some embodiments, one or more of the customer's computing machines may be coupled to the centralized server 110 via a proxy, such as the proxy 125 between the computing machine 120B and the centralized server 110. The proxy 125 may cache software packages to enhance performance, speed up downloads, and offload some of the operations from the centralized server 110.

In some embodiments, the internal network 103 includes a local area network (LAN) protected from unauthorized access. For instance, a firewall may be employed at a gateway or proxy of the LAN to prevent unauthorized access to the LAN. Through the secured connection 130, the centralized server 110 within the internal network 103 may access the external server 170 external to the internal network 103. For example, the external server 170 may host a website of the software vendor and the centralized server 110 may establish the secured connection 130 to the website using one or more Internet security protocol (e.g., secure socket layer (SSL), secure shell (SSH), transport layer security (TLS), etc.). Thus, the centralized server 110 may securely retrieve or download various items from the external server 170, such as items that are available only by purchase and/or license (e.g., metadata of an operating system, such as Red Hat Enterprise Linux provided by Red Hat, Inc. of Raleigh, N.C., information on provisioning computing resources executables of client applications, etc.). The items retrieved are stored locally in a storage device internal to the centralized server 110 and/or in the database 112 coupled to the centralized server 110 within the internal network 103. Alternatively, these items may be stored in a Network Storage (NAS) device. In other words, the metadata and information are stored locally within the customer's internal network 103. After downloading the items from the external server 170, the centralized server 110 may terminate the secure connection 130 such that no talk back to the external server 170 is allowed. As such, the above approach allows the customer to take the customer's system off the external network (e.g., the Internet), and hence, providing more optimization, flexibility, and control of the system to the customer.

The centralized server 110 may synchronize with the external server 170 by checking with the external server 170 for updates and/or changes to the items retrieved previously. Such synchronization may be performed periodically and/or in response to user request. Alternatively, the external server 170 may notify the centralized server 110 when there are changes and/or updates to the items previously provided to the centralized server 110. When there is a change to an item previously retrieved, the centralized server 110 may retrieve the change from the external server 170 and then update a copy of the item on the centralized server 110 accordingly, or the centralized server 110 may simply retrieve an updated version of the item to replace the previously retrieved version. In some embodiments, synchronization is performed via one or more channels within the secured connection 130 between the centralized server 110 and the external server 170. A channel as used herein refers to a collection of software packages organized into a logical grouping. For example, the set of packages that make up an operating system is organized into a channel in some embodiments. Different types of items may be associated with different channels such that the centralized server 110 may choose to synchronize a subset of the channels as needed. For example, information related to provisioning virtual hosts and virtual guests may be associated with a Tool channel.

Alternatively, the centralized server 110 may synchronize with the external server 170 via machine-readable storage media, such as compact discs (CDs), flash memory cards with Universal Serial Bus (USB) connectors, etc. The machine-readable storage media may also be referred to as computer-readable storage media. When there is a change to an item previously provided to the centralized server 110, the change to the item or an updated version of the item may be stored onto the machine-readable storage media from the external server 170. Then the machine-readable storage media may be delivered to the customer, who would provide the machine-readable storage media to the centralized server 110. By providing the machine-readable storage media to the centralized server 110, the centralized server 110 obtains the metadata and information from the machine-readable storage media and subsequently, uses the metadata and information to manage the computing machines 120A-120C as well as the virtual hosts and virtual guests provisioned on the computing machines 120A-120C.

In some embodiments, the centralized server 110 further generates a GUI served over HTTP, also referred to as a web user interface (web UI), which may be displayed via the console 114. Users may access the GUI via secured connections over the Internet. As such, users may manage the internal network 103 conveniently from a remote location. The GUI includes various user interface control (e.g., buttons, scroll bars, text fields, drop-down list, etc.) to allow users to manage the computing machines 120A-120C as well as virtual machines running on them. For example, via the GUI, users may manage virtualization in the customer's internal network 103 (e.g., by provisioning virtual hosts and virtual guests running on the computing machines 120A-120C, stopping or deleting the virtual hosts and virtual guests, etc.). For example, a user may input the memory and processing requirements of a virtual guest via the GUI. Then the centralized server 110 may instruct a hypervisor of one or more of the computing machines 120A-120C to provision a virtual guest according to the memory and processing requirements.

Furthermore, via the GUI, users may configure the computing machines 120A-120C and/or virtual hosts and virtual guests running on the computing machines 120A-120C, and manage errata of software installed on the computing machines 120A-120C and/or virtual hosts and virtual guests running on the computing machines 120A-120C. An errata as used herein broadly refers to a textual publication accompanying a software update that describes the contents and application of the update to the user's systems. In some embodiments, the GUI allows users to manage software packages (e.g., by keeping track of the applications installed on the computing machines 120A-120C and/or virtual hosts and virtual guests running on the computing machines 120A-120C and the versions of the applications installed, scheduling installation and/or updates of applications, etc.), etc. The GUI greatly improves convenience to users because users may remotely log onto the centralized server 110 to access the GUI to manage the computing machines 120A-120C as well as the virtual hosts and virtual guests running on the computing machines 120A-120C, instead of manually installing an operating system on each computing machine, such as by using CDs storing instructions to cause the computing machine to install the operating system, and then provisioning one or more virtual hosts and virtual guests on the computing machine. Furthermore, with the centralized server 110 deployed locally within the customer's internal network 103, both performance and security may be significantly improved over managing the virtual hosts and virtual guests running on the customer's computing machines 120A-120C directly from the external server 170 over an external network.

Figure 2:
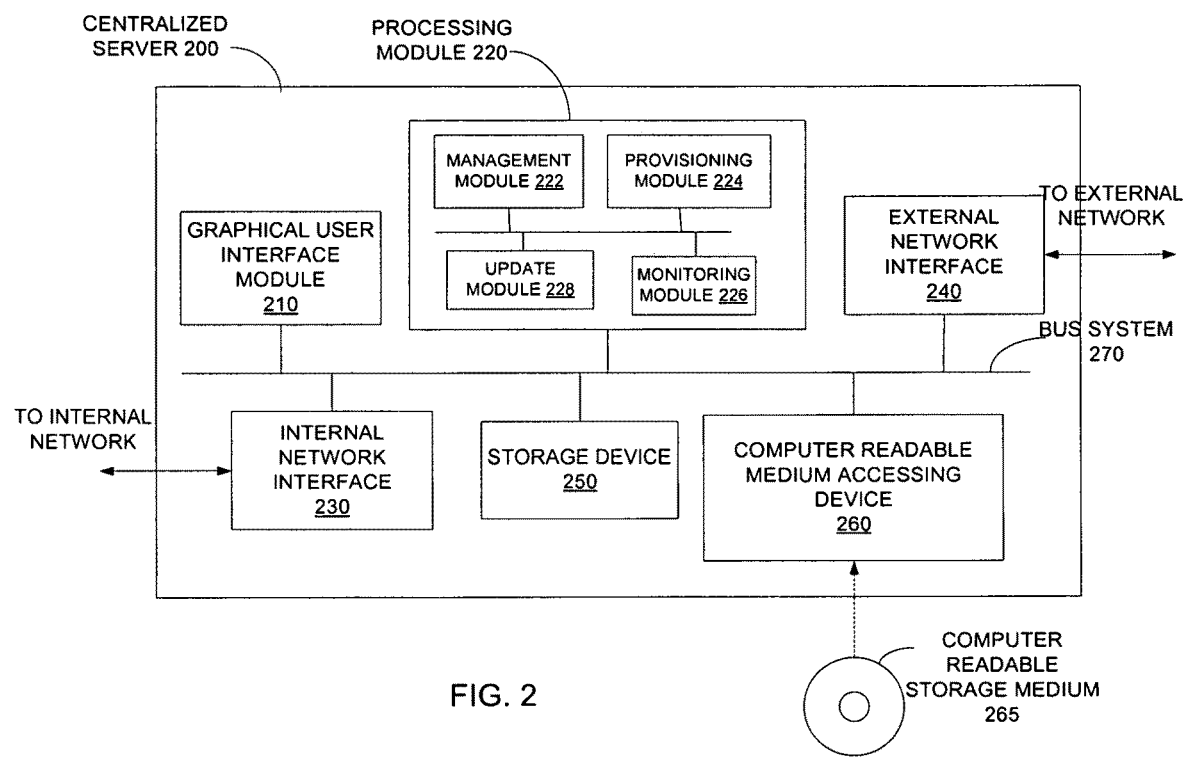
FIG. 2 illustrates a functional block diagram of one embodiment of a centralized server.

FIG. 2 illustrates a functional block diagram of one embodiment of a centralized server. The centralized server 200 includes a graphical user interface module 210, a processing module 220, an internal network interface 230, an external network interface 240, a storage device 250, and a computer-readable medium accessing device 260, which are coupled to each other via a bus system 270. The processing module 220 further includes a management module 222, a provisioning module 224, a monitoring module 226, and an update module 228.

In some embodiments, the centralized server 200 is communicably coupled to an internal network of a customer of a software vendor via the internal network interface 230. The internal network further includes one or more physical computing machines of the customer, such as servers, workstations, desktop PCs, laptops, etc. The centralized server 200 is further coupled to an external network, such as the Internet, via the external network interface 240. The external network interface 240 may establish a secured connection to access a external server provided by the software vendor (such as the external server 170 in FIG. 1) to retrieve various items from the external server, such as metadata of an operating system, information on provisioning virtual hosts and virtual guests, application upgrades, etc. These items retrieved may be stored in the storage device 250 within the centralized server 200. Alternatively, some or all of the items retrieved may be stored in a database external to the centralized server 200, such as database 112 in FIG. 1. The centralized server 200 may access the database via the internal network interface 230. Furthermore, the update module 228 may synchronize with the external server by retrieving from the external server updates to items previously retrieved from periodically or in response to user requests.

Alternatively, the centralized server 200 may obtain the metadata of an operating system, information on provisioning virtual hosts and virtual guests, application upgrades, etc., from a computer-readable storage medium 265 selectively coupled to the computer-readable medium accessing device 260. Some examples of the computer-readable storage medium 265 and computer-readable storage medium accessing device 260 include a CD and a CD-ROM drive, a flash memory card with a USB connector and a USB drive, etc. The external server of the software vendor may store the metadata of an operating system, information on provisioning virtual hosts and virtual guests, application upgrades, etc., onto the computer-readable storage medium 265, which is then delivered to the customer for the centralized server's 200 use.

In some embodiments, the centralized server 200 further includes a graphical user interface (GUI) module 210. The GUI module 210 is operable to generate a GUI to allow users to manage the customer's physical computing machines within the internal network as well as virtual machines running on the physical computing machines. Through the GUI, users may configure the physical computing machines, input requirements and/or specifications for provisioning virtual machines (including virtual hosts and virtual guests), and schedule provisioning of the virtual machines. For example, users may set the maximum amount of memory and the number of central processing units (CPUs) to be used by each virtual guest of a virtual host.

Users may log onto the centralized server 200 to access the GUI in order to manage various computing machines (both physical and virtual computing machines) over the internal network, instead of requiring users to log onto individual physical computing machine in order to manage a particular physical computing machine or virtual machines running on the particular physical computing machine. As such, the above approach greatly improves convenience for users. Moreover, by adopting a graphical style, the GUI is made user-friendlier than many conventional user interfaces (e.g., command line interface). As such, overall user experience may be significantly improved.

Based on the input by the users via the GUI, the management module 222 of the processing module 220 configures the virtual and physical computing machines within the internal network of the customer. The provisioning module 224 provisions virtual hosts and virtual guests over the physical computing machines. Then the management module 222 configures virtual and physical hosts according to schedules set up by the users. While the virtual hosts and virtual guests are running, the monitoring module 226 may monitor the computing resource usage by the virtual hosts and virtual guests and send the information to the management module 222. Based on the computing resource usage, the management module 222 may adjust assignment of computing resources (e.g., memory, computing threads provided by CPUs, CPUs, etc.) to the virtual hosts and virtual guests. When there are updates from the software vendor, the update module 228 may retrieve the updates from the external server and provide the updates to the virtual hosts and virtual guests.

Figure 3:
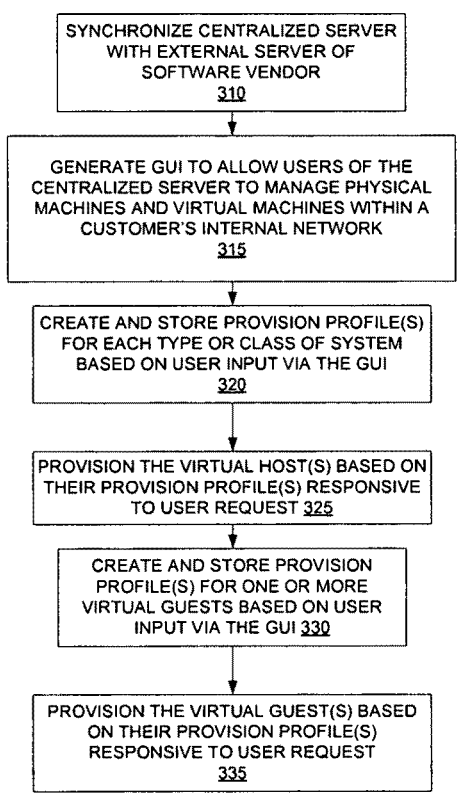
FIG. 3 illustrates one embodiment of a process to manage virtualization using a centralized server.

FIG. 3 illustrates one embodiment of a process to manage virtualization using a centralized server. The process may be performed by processing logic that may comprise hardware (e.g., circuitry, dedicated logic, programmable logic, microcode, etc.), software (such as instructions run on a processing device), firmware, or a combination thereof. For example, the processing module 220 of the centralized server 200 shown in FIG. 2 may perform at least part of the process.

Initially, processing logic synchronizes a centralized server with a external server provided by a software vendor (processing block 310). The centralized server is within an internal network of a customer of the software vendor. In some embodiments, processing logic establishes a secure connection between the centralized server and the external server to download various data and information from the external server. Alternatively, the data and information may be stored onto computer-readable storage media (e.g., CDs, flash memory cards, etc.), which are delivered to the customer to be input to the centralized server. By synchronizing with the external server, the centralized server obtains the latest version of metadata of an operating system, information on provisioning, executable of applications, etc. Then processing logic generates a GUI to allow users of the centralized server to manage physical machines and virtual machines within the customer's internal network (processing block 315). Via the GUI, users of the centralized server may input specifications and/or requirements of the virtual machines. Based on the user input, processing logic creates a provisioning profile for each type or class of system, and stores the provisioning profile on the centralized server (processing block 320). Then processing logic provisions the virtual hosts based on their corresponding provisioning profiles responsive to user request (processing block 325).

Likewise, processing logic creates and stores provisioning profiles for virtual guests on the centralized server based on user input via the GUI (processing block 330). Each virtual guest may have one provisioning profile. Alternatively, multiple virtual guests may share the same provisioning profile. Then processing logic provisions the virtual guests based on their corresponding provisioning profiles responsive to user request (processing block 335). For example, the user may schedule a time to provision a particular virtual host and/or a virtual guest via the GUI. At the scheduled time, processing logic may send instructions to one or more of the physical computing machines to instruct their hypervisors to provision the virtual host and/or virtual guest. Another example is described in more details below to further illustrate the concept. In this example, a user creates the provisioning profile using the GUI. Then the user either instantiates a new virtual machine, or selects an existing virtual or physical machine, and directs the centralized server to provision that machine using the previously created provisioning profile. The centralized server sends instructions to the virtual or physical machine to cause that machine to provision itself. At the beginning of the provisioning process, the machine sends a request to the centralized server for configuration details needed for provisioning. The centralized server responds with the details from the user-created provisioning profile created earlier. The machine being provisioned requests and receives the software needed from the centralized server. When provisioning is complete, the provisioned machine notifies the centralized server so.

Figure 4A:
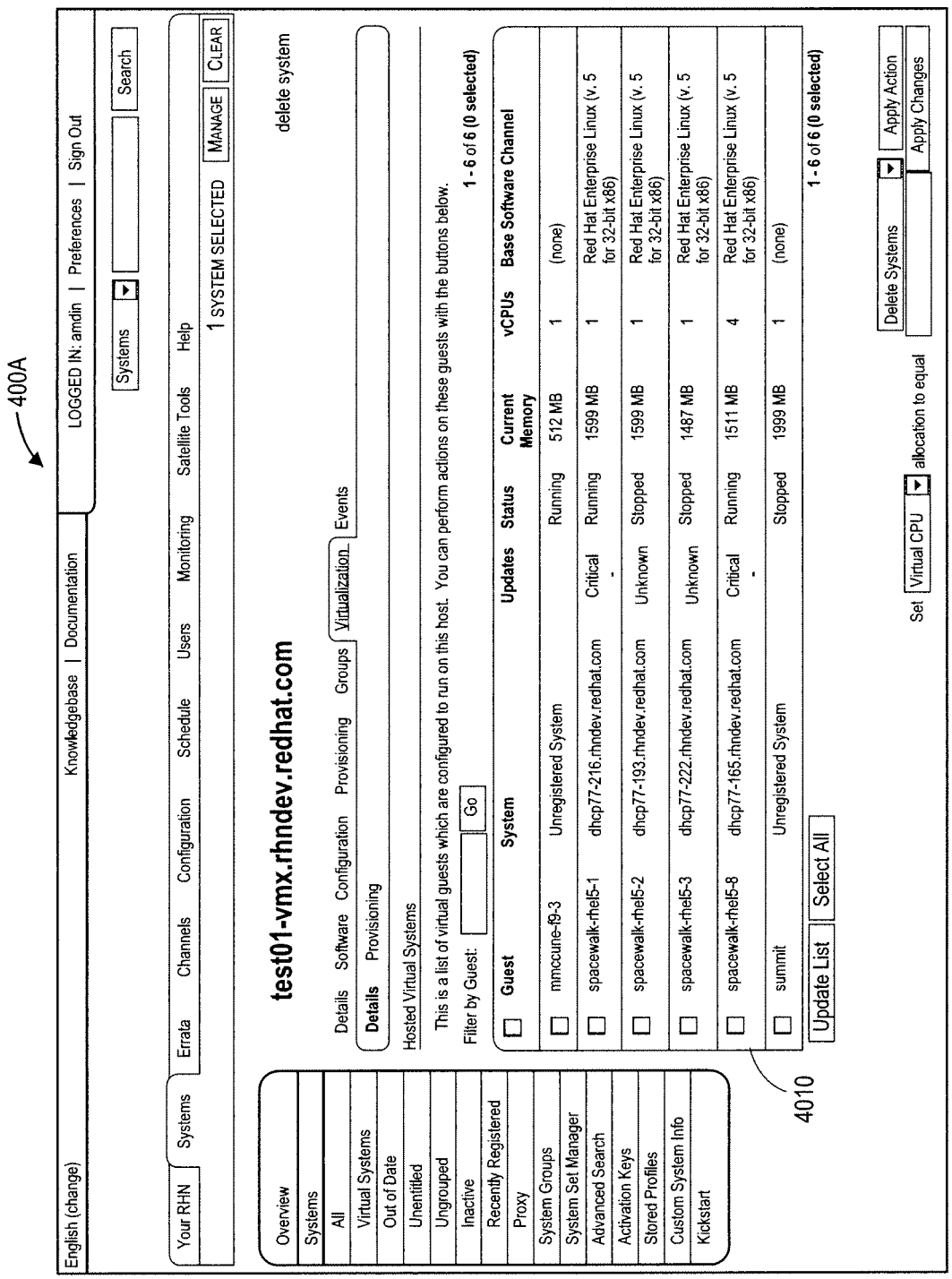
Figure 4C:
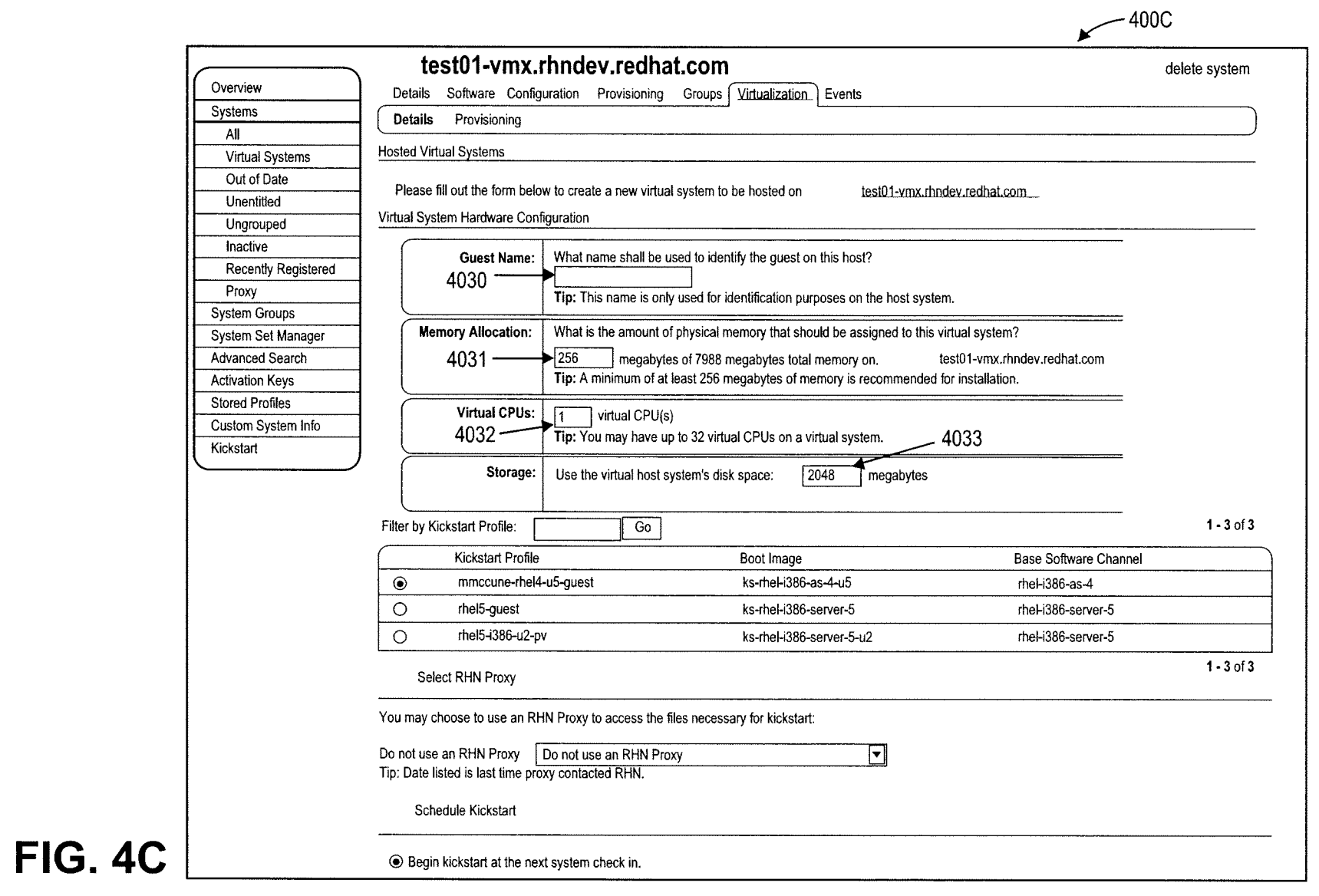

FIGS. 4A-4C illustrate some embodiments of the GUI. Referring to FIG. 4A, the GUI 400A displays a list 4010 of running virtual guests on a virtual host listed at the top of the GUI 400A, namely, test01-vmx.rhndev.redhat.com. In the current example, there are six (6) virtual guests running on the virtual host. Various information of the virtual guests is also displayed in the list 4010, including their corresponding system, availability of updates, current status, current memory usage, number of virtual CPUs used, and base software channel used. From GUI 400A, users may manage the virtual guests, such as to start, stop, delete, reboot, and configure the virtual guests.

FIG. 4B illustrates another embodiment of the GUI. The GUI 400B in FIG. 4B displays the entire list 4020 of virtual hosts and virtual guests that a centralized server manages. In addition, the GUI 400B shows the parent-child relationship between the virtual hosts and the virtual guests by listing all virtual guests of a particular virtual host beneath the particular virtual host.

FIG. 4C illustrates another embodiment of the GUI. The GUI 400C in FIG. 4C allows users to provision a new virtual guest on a virtual host, namely, test01-vmx. Users may specify the parameters to create the new virtual guest by entering initial setup parameters, including name, memory, CPU, and virtual disk size for the virtual guest, in the text fields 4030-4033.

Figure 5A:
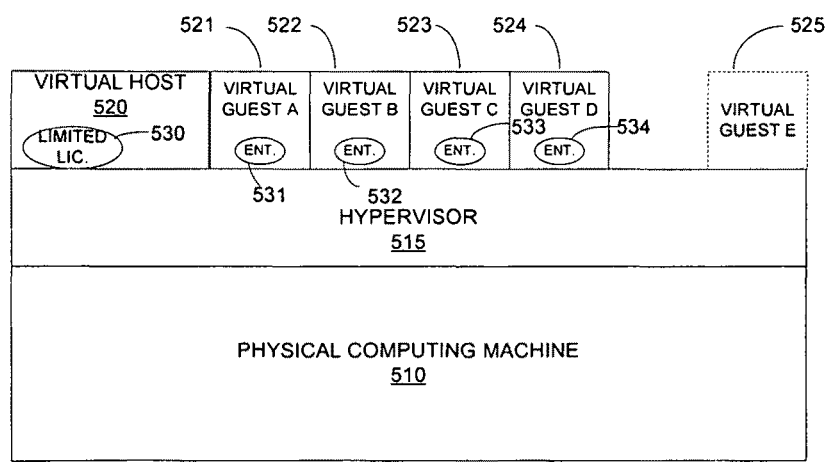
FIGS. 5A-5B illustrate some embodiments of some virtual guests.
Figure 5B:
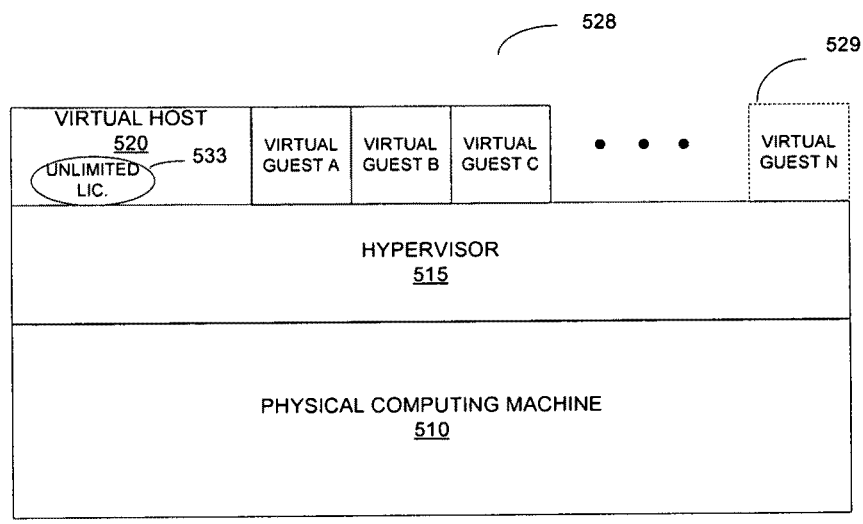

FIGS. 5A-5B illustrate some embodiments of some virtual guests and virtual host provisioned on a physical computing machine by a centralized server. Referring to FIG. 5A, a physical computing machine 510 has a hypervisor 515 running on it. Broadly speaking, the hypervisor 515 acts as a virtualization controller on the physical computing machine 510 to allow a virtual host 520 and one or more virtual guests (such as virtual guest A 521, virtual guest B 522, etc.) to run on the physical computing machine 510. In the current example, each of the virtual host 520 and the virtual guests 521-524 has a copy of the same operating system running on it. However, the virtual host 520 and the virtual guests 521-524 may have different operating systems in some embodiments.

Referring to FIG. 5A, an owner of the physical computing machine 510 has obtained a limited license 530 to the operating system for the virtual host 520. Under the limited license 530, the virtual host 520 has up to a predetermined number of entitlements to the operating system, which is four (4) in the current example. Thus, the virtual host may provision up to four virtual guests having a copy of the operating system running on each of them without charging the user for an additional entitlement. As illustrated in FIG. 5A, the virtual guests A-D 521-524 have consumed four entitlements 531-534. Because the provisioning of virtual guests is managed by the centralized server, the centralized server has to keep track of the licenses and entitlements of the operating system.

Suppose the virtual host 520 attempts to provision a fifth virtual guest E 525 to run an additional copy of the operating system, the virtual host 520 may send a request via the hypervisor 515 to a centralized server (such as the centralized server 110 in FIG. 1) managing the physical computing machine 510 for allowing the additional copy of the operating system. Because the number of entitlements is limited to 4 under the limited license 530, the centralized server charges the user one (1) entitlement for the copy of operating system on the fifth virtual guest E 525. When the user runs out of entitlements, then the request to provision a new virtual guest would be rejected. However, the virtual host 520 may delete one of the existing virtual guests 521-524 to free up an entitlement. Then the centralized server would allow running another copy of the operating system on the newly provisioned virtual guest.

FIG. 5B illustrates an alternate type of license, namely an unlimited license 533. Referring to FIG. 5B, the virtual host 520 has obtained the unlimited license 533 instead of the limited license 530 shown in FIG. 5A. Under the terms of the unlimited license 533, the virtual host 520 may have an unlimited number of copies of operating system running on its virtual guests 528.

When the virtual host 520 attempts to provision an additional virtual guest N 529 to run an additional copy of the operating system, the virtual host 520 may send a request via the hypervisor 515 to a centralized server (such as the centralized server 110 in FIG. 1) managing the physical computing machine 510 for allowing the additional copy of the operating system. Because the number of entitlements is unlimited under the unlimited license 533, the centralized server grants the request. As a result, the virtual host 520 successfully provisions the virtual guest N 529 to run another copy of the operating system.

Note that the above approach can be applied to other embodiments of virtualization. For example, in one alternate embodiment, the virtual host runs directly on the physical machine and the virtual guests run on the virtual host, where the entitlement model may be applied as discussed above.

Using the above approach, the software vendor can manage licenses and entitlements usage by the customer via the centralized server. Note that the above two types of licenses discussed (namely, the unlimited license 533 and the limited license 530) are some of the examples of licenses used in some embodiments. Other embodiments of the current invention may include other types of licenses.

Figure 6:
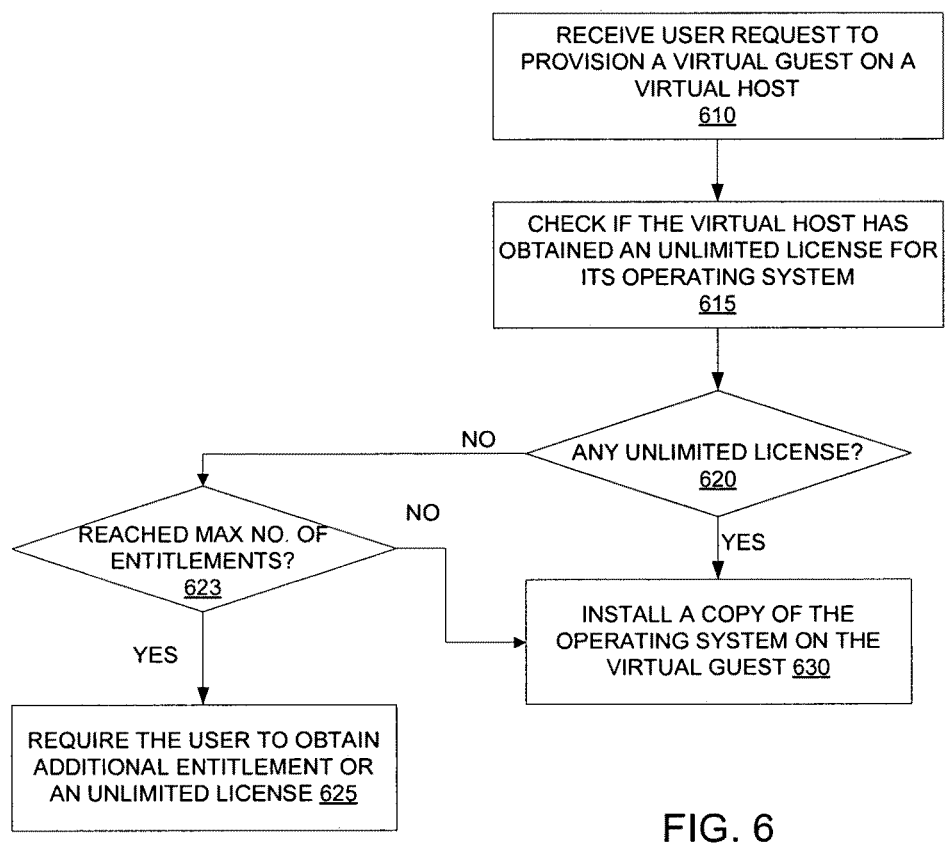
FIG. 6 illustrates one embodiment of a process to manage entitlement.

FIG. 6 illustrates one embodiment of a process to manage entitlement. The process may be performed by processing logic that may comprise hardware (e.g., circuitry, dedicated logic, programmable logic, microcode, etc.), software (such as instructions run on a processing device), firmware, or a combination thereof. For example, the processing module 220 of the centralized server 200 shown in FIG. 2 may perform at least part of the process.

Referring to FIG. 6, processing logic receives a user request to provision a virtual guest on a virtual host (processing block 610). If provisioned, the virtual guest would get a copy of an operating system from a software vendor. In response to the request, processing logic checks if the virtual host has obtained an unlimited license for the operating system (processing block 615). If it is determined that the virtual host has an unlimited license at block 620, then the process transitions to block 630 to install a copy of the operating system on the virtual guest as requested. Otherwise, if it is determined that the virtual host has no unlimited license at block 620, the process transitions to block 623.

At processing block 623, processing logic further determines if the maximum number of entitlements have been reached. As mentioned above, each virtual guest running a copy of the operating system consumes one entitlement if its virtual host has a limited license to the operating system. If the maximum number of entitlements has been reached on the virtual host, then the process transitions to processing block 625. At block 625, processing logic requires the user to obtain an additional entitlement or an unlimited license from the software vendor. In response, the user may purchase an additional entitlement or an unlimited license from the software vendor. Alternatively, the user may delete an existing virtual guest to free up an entitlement and then attempt to provision the virtual guest again. If processing logic determines at block 623 that the maximum number of entitlements has not been reached yet, then the process transitions to processing block 630. At processing block 630, processing logic installs a copy of the operating system on the virtual guest as requested.

Figure 4D:
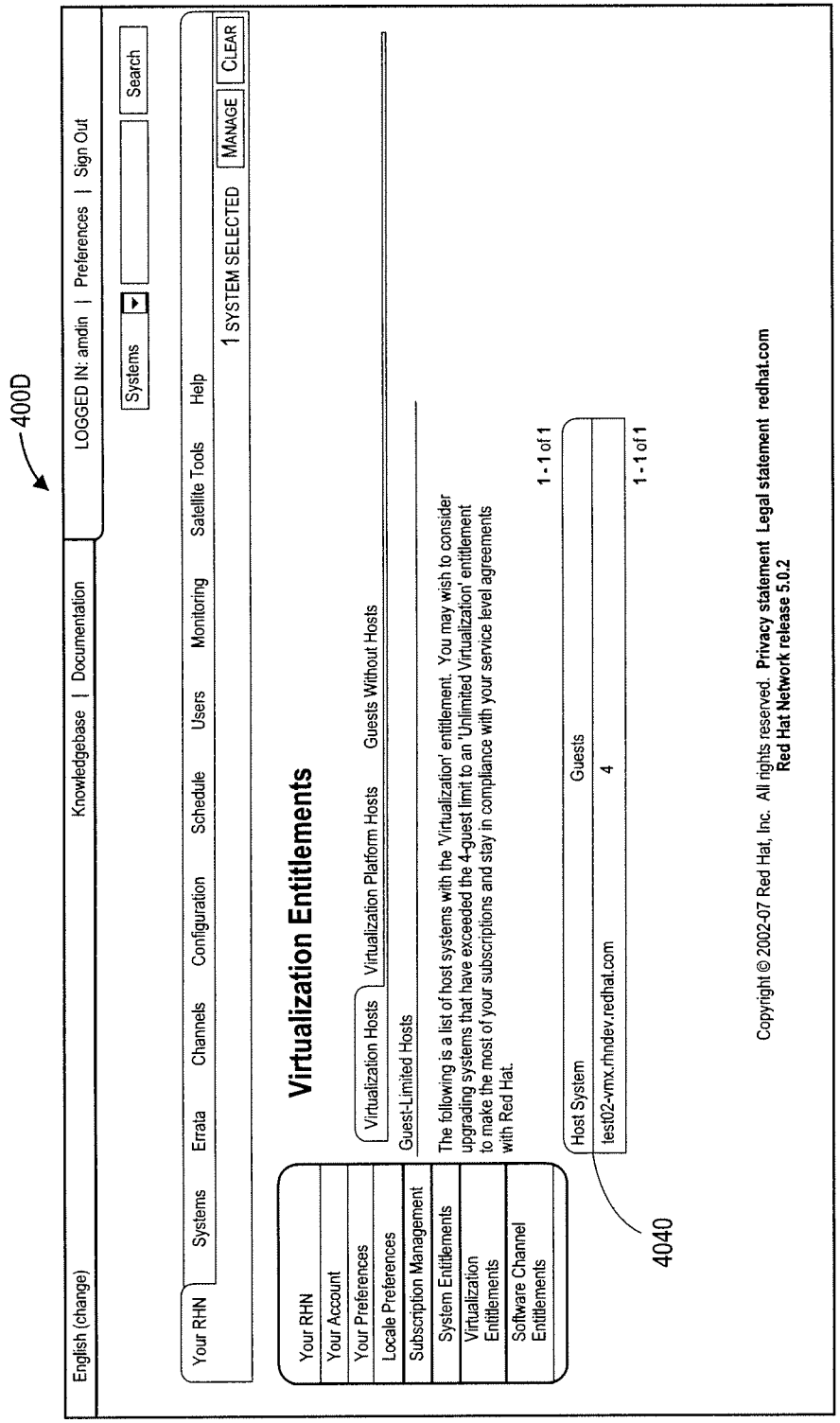
Figure 4E:
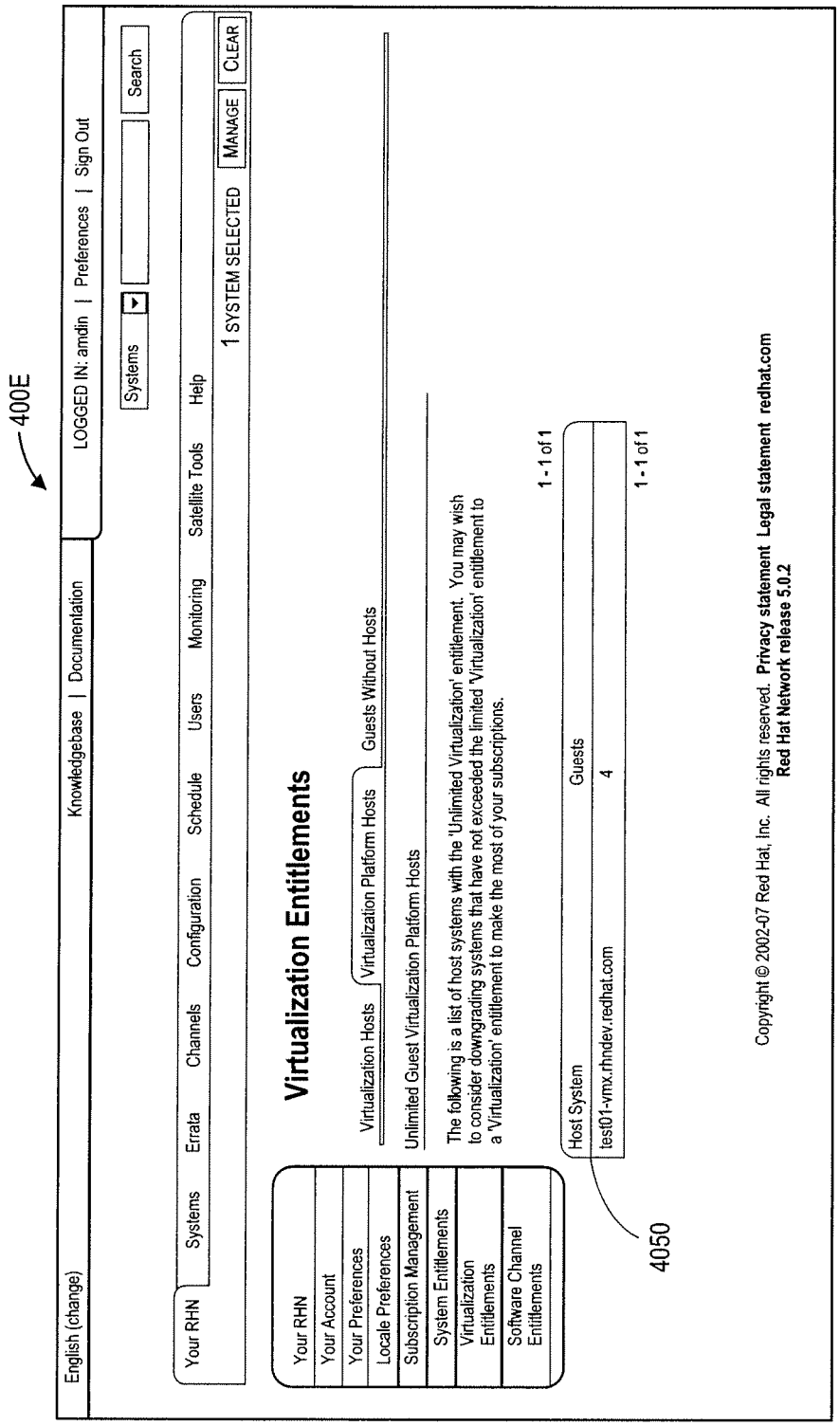
Figure 4F:
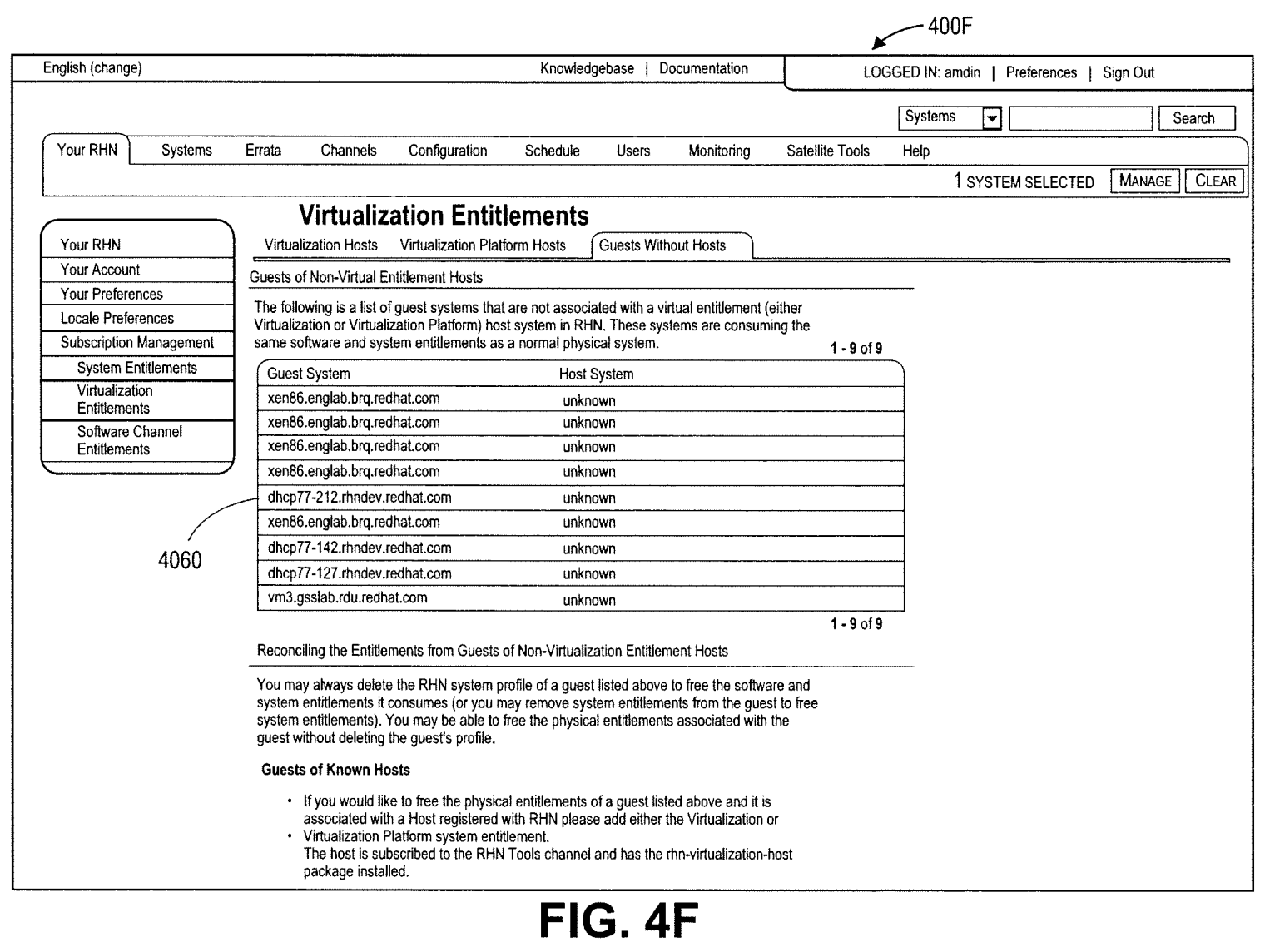

In some embodiments, users may manage entitlements via a GUI generated by a centralized server, such as the centralized server 110 in FIG. 1. Some exemplary embodiments of the GUI used to manage entitlements are shown in FIGS. 4D-4F. Note that these exemplary embodiments are shown only for illustrative purpose. Other embodiments of GUIs may be generated and used in other embodiments.

FIG. 4D illustrates one embodiment of the GUI related to entitlement management. The GUI 400D in FIG. 4D displays a list 4040 of host systems that have been granted a limited license from a software vendor to have up to a predetermined number of virtual guests running on them, each having a copy of an operating system from the software vendor. These virtual guests are sometimes referred to as "free" virtual guests because they do not cost any additional entitlement to run. In the current example, there is one virtual host system, test02-vmx.rhndev.redhat.com, having been granted a limited license to have up to four (4) "free" virtual guests running thereon.

FIG. 4E illustrates another embodiment of the GUI. The GUI 400E in FIG. 4E displays a list 4050 of virtual hosts that have been granted an unlimited license from a software vendor to have unlimited virtual guests running on these virtual hosts. Each virtual guest has a copy of an operating system from the software vendor. These virtual guests do not cost any software entitlement to run. In other words, the virtual hosts have unlimited virtualization entitlements. In the current example, the virtual host, test01-vmx.rhndev.redhat.com, has been granted an unlimited license to have unlimited virtual guests running on it.

FIG. 4F illustrates another embodiment of the GUI. The GUI 400F in FIG. 4F shows a list 4060 of virtual guests that are not running on a host having an unlimited license. In other words, each of these virtual guests consumes a software entitlement for its use.

Figure 7:
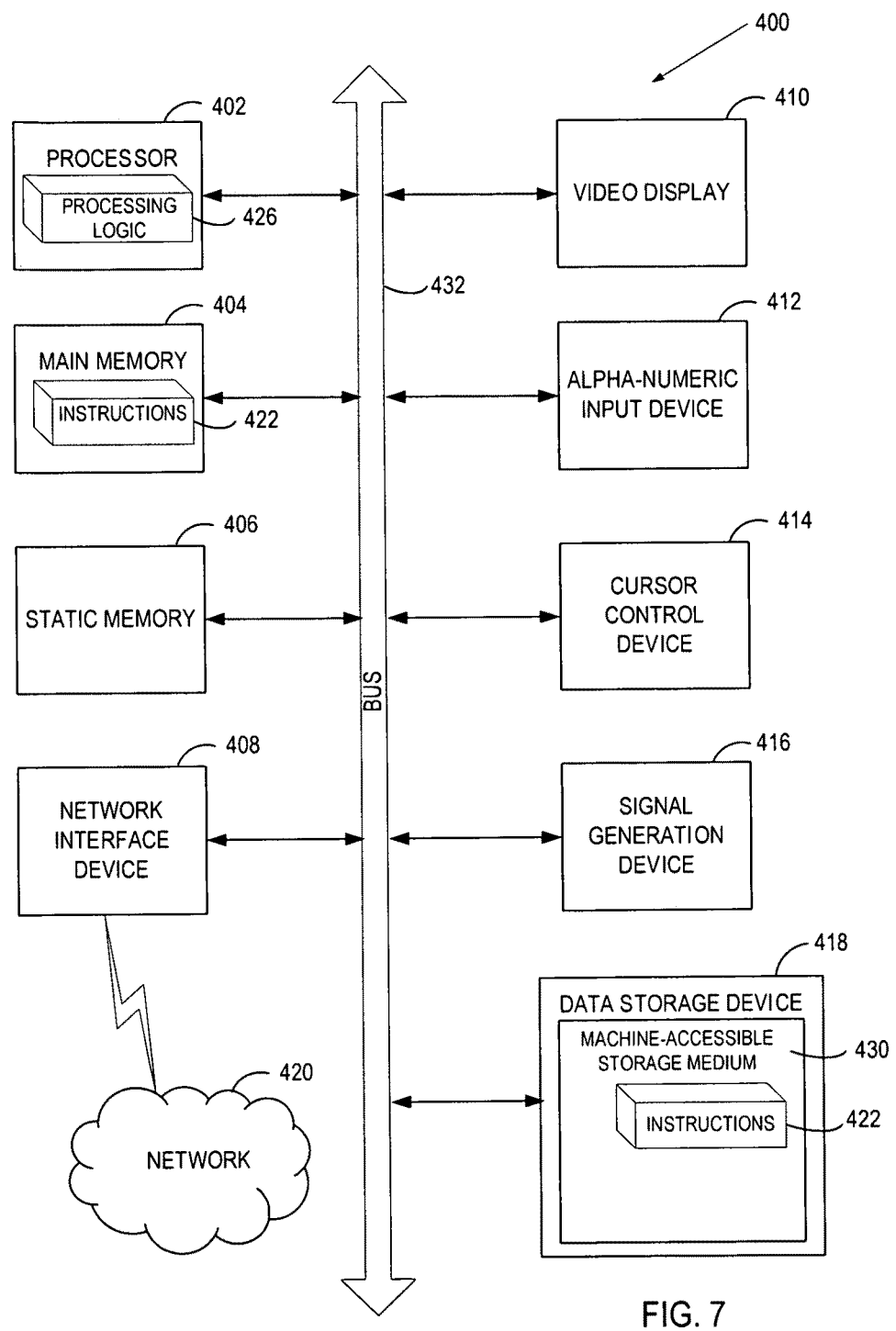
FIG. 7 illustrates a block diagram of an exemplary computer system, in accordance with one embodiment of the present invention.

FIG. 7 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium or a computer-readable medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of virtualization management using a centralized server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   querying, by a processing device of a first server, a hypervisor of a physical computing machine, the physical computing machine executing a virtual host and a first virtual guest, wherein the querying is regarding entitlements associated with the virtual host and the first virtual guest;
   instructing, by the processing device, the virtual host to provision the first virtual guest with a copy of an operating system executing on the virtual host and that is provided by a software vendor, wherein the first server is coupled, across an internal network of a customer, to the physical computing machine;
   receiving, from the hypervisor, identification of a type of entitlement corresponding to the operating system of the virtual host and the operating system currently used by the first virtual guest;
   distributing, by the processing device in view of the type of entitlement and a number of copies of the operating system provisioned by the virtual host, a second copy of the operating system to at least a second virtual guest of the virtual host;
   retrieving from an external server of the software vendor, by the processing device synchronizing with the external server, metadata related to the operating system provisioned by the virtual host, wherein the external server is located outside of the internal network of the customer;
   retrieving, by the processing device, a specification and resource requirements of the second virtual guest received by the first server through a graphical user interface, wherein the specification and resource requirements are related to execution of the operating system on the second virtual quest;
   creating, by the processing device for the second virtual guest, a provisioning profile in view of the operating system, the metadata related to the operating system, and in view of the specification and resource requirements of the second virtual guest;
   responsive to receiving updated information associated with the entitlements, updating, by the processing device, the provisioning profile for the second virtual guest to generate an updated provisioning profile; and
   instructing the hypervisor of the physical computing machine, by the first server in response to a request, to provision the second virtual guest in view of the updated provisioning profile.

2. The method of claim 1, wherein the first virtual guest and the virtual host are managed by the first server.

3. The method of claim 1, wherein responsive to the number of copies of the operating system exceeding a threshold and the virtual host having a limited license of the operating system:

releasing, by the processing device, an entitlement of the operating system from the first virtual guest for use by the second virtual guest, and charging an account of the customer, by the processing device, for use of the entitlement by the second virtual guest.

4. The method of claim 1, further comprising allowing, via the first server, an unlimited number of copies of the operating system to be provisioned in response to the virtual host having an unlimited license.

5. The method of claim 2, further comprising:

receiving an update of the operating system from the software vendor, by the first server, after distributing the second copy of the operating system to the second virtual guest; and distributing the updates, via the server, to at least one other virtual guest.

6. The method of claim 1, wherein the first server distributes the second copy of the operating system to the second virtual guest in response to a request to provision the second virtual guest.

7. The method of claim 1, further comprising releasing an entitlement of the operating system, via the first server in response to the first virtual guest being deleted and the virtual host having a limited license.

8. The method of claim 1, further comprising determining current computing resource usage by the first virtual guest for which an entitlement of the operating system is to be released.

9. The method of claim 1, wherein the receiving the updated information comprises providing a prompt to a user computing device to purchase an adjustment to a number of the entitlements associated with the virtual host.

10. A system comprising:

a network interface; and a processing device communicably coupled to the network interface, the processing device to:

query, over the network interface, a hypervisor of a physical computing machine, the physical computing machine executing a virtual host and a first virtual guest, regarding entitlements associated with the virtual host and the virtual guest;

instruct, across an internal network to the physical computing machine, the virtual host to provision the first virtual guest with a copy of an operating system executing on the virtual host and that is provided by a software vendor;

receive, from the hypervisor, identification of a type of entitlement corresponding to the operating system of the virtual host and the operating system currently used by the first virtual guest;

distribute, via the network interface in view of the type of entitlement and a number of copies of the operating system provisioned by the virtual host, a second copy of the operating system to a second virtual guest of the virtual host;

retrieve from an external server of the software vendor, by synchronizing with the external server, metadata related to the operating system provisioned by the virtual host, wherein the external server is located outside of the internal network of the customer;

retrieve a specification and resource requirements of the second virtual guest received through a graphical user interface, wherein the specification and resource requirements are related to execution of the operating system on the second virtual guest;

create, for the second virtual guest, a provisioning profile in view of the operating system, the metadata related to the operating system, and in view of the specification and resource requirements of the second virtual guest;

responsive to receiving updated information associated with the entitlements, update the provisioning profile for the second virtual guest to generate an updated provisioning profile; and instruct the hypervisor of the physical computing machine, in response to a request, to provision the second virtual guest in view of the updated provisioning profile.

11. The system of claim 8, wherein the processing device is also to manage the first virtual guest and the virtual host.

12. The system of claim 10, wherein the processing device is further to limit the number of copies of the operating system in response to the virtual host having a limited license of the operating system.

13. The system of claim 10, wherein the processing device is further to allow an unlimited number of copies of the operating system to be provisioned in response to the virtual host having an unlimited license.

14. The system of claim 10, further comprising:

an external network interface, communicably coupled to a network external to the internal network of the customer via a secured connection, to receive an update of the operating system from the software vendor after at least one copy of the operating system is distributed to the second virtual guest; and wherein the processing device is to distribute the updates to the second virtual guest.

15. The system of claim 10, wherein the processing device is to retrieve updates of the operating system after the second copy of the operating system is distributed to the second virtual guest, and wherein the processing device is to distribute the updates to the second virtual guest.

16. The system of claim 10, wherein responsive to the number of copies of the operating system exceeding a threshold and the virtual host having a limited license of the operating system, the processing device is further to:

release an entitlement of the operating system from the first virtual guest for use by the second virtual guest, and charge an account of the customer for the second virtual guest for the entitlement.

17. The system of claim 10, wherein the processing device is further to release an entitlement of the operating system in response to the first virtual guest being deleted and the virtual host having a limited license.

18. A non-transitory computer-readable medium comprising executable instructions that, when executed by a processing device, cause the processing device to:

query, a first server, a hypervisor of a physical computing machine, the physical computing machine executing a virtual host and a first virtual guest, wherein the query is regarding entitlements associated with the virtual host and the first virtual guest;

instruct the virtual host to provision the first virtual guest with a copy of an operating system executing on the virtual host and that is provided by a software vendor, wherein the first server is coupled, across an internal network of a customer, to the physical computing machine;

receive, by the processing device of the first server from the hypervisor, identification of a type of entitlement corresponding to the operating system of the virtual host and the operating system currently used by the first virtual guest;

distribute, by the processing device in view of the type of entitlement and a number of copies of the operating system currently provisioned by the virtual host, a second copy of the operating system to a second virtual guest of the virtual host;

retrieve from an external server of the software vendor, by synchronizing with the external server, metadata related to the operating system provisioned by the virtual host, wherein the external server is located outside of the internal network of the customer;

retrieve a specification and resource requirements of the second virtual guest received by the first server through a graphical user interface, wherein the specification and resource requirements are related to execution of the operating system on the second virtual guest;

create, for the second virtual guest, a provisioning profile in view of the operating system, the metadata related to the operating system, and of the specification and in view of the resource requirements of the second virtual guest;

responsive to receiving updated information associated with the entitlements, update the provisioning profile for the second virtual guest to generate an updated provisioning profile; and instruct the hypervisor of the physical computing machine, in response to a request, to provision the second virtual guest in view of the updated provisioning profile.

19. The non-transitory computer-readable medium of claim 18, wherein the first virtual guest and the virtual host are managed by the first server.

20. The non-transitory computer-readable medium of claim 18, wherein responsive to the number of copies of the operating system exceeding a threshold and the virtual host having a limited license of the operating system, the executable instructions further cause the processing device to:

release an entitlement of the operating system from the first virtual guest for use by the second virtual guest, and charge an account of the customer for the second virtual guest for the entitlement.

21. The non-transitory computer-readable medium of claim 18, wherein the executable instructions further cause the processing device to allow, via the first server, an unlimited number of copies of the operating system to be provisioned in response to the virtual host having an unlimited license.

22. The non-transitory computer-readable medium of claim 18, wherein the executable instructions further cause the processing device to:

receive an update of the operating system from the software vendor, by the first server, after distributing the second copy of the operating system to the second virtual guest; and distribute the updates, via the first server, to the second virtual guest.

23. The non-transitory computer-readable medium of claim 18, wherein the executable instructions further cause the processing device to release an entitlement of the operating system, via the first server in response to the first virtual guest being deleted and the virtual host having a limited license.

* * * * *